(12) United States Patent
von Gutfeld et al.

(10) Patent No.: US 6,741,302 B2
(45) Date of Patent: May 25, 2004

(54) SYSTEM AND METHOD FOR UTILIZING DIFFUSE AND SPECULAR RADIATION TO OVERCOME SHADOWED REGIONS

(75) Inventors: Robert Jacob von Gutfeld, New York, NY (US); James H. Glownia, Somers, NY (US); Fuad Elias Doany, Katonah, NY (US)

(73) Assignee: International Business Machines Corporation, Armonk, NY (US)

( * ) Notice: Subject to any disclaimer, the term of this patent is extended or adjusted under 35 U.S.C. 154(b) by 217 days.

(21) Appl. No.: 09/884,056

(22) Filed: Jun. 20, 2001

(65) Prior Publication Data

US 2002/0196391 A1 Dec. 26, 2002

(51) Int. Cl.$^7$ .................. G02F 1/1335; B32B 31/28
(52) U.S. Cl. .................. 349/64; 349/112; 349/187; 156/272.2; 156/379.6
(58) Field of Search .................. 156/272.2, 275.5, 156/379.6; 349/64, 112, 187, 190

(56) References Cited

U.S. PATENT DOCUMENTS

| | | |
|---|---|---|
| 5,263,888 A | 11/1993 | Ishihara et al. |
| 6,179,679 B1 | 1/2001 | von Gutfeld et al. |
| 6,284,087 B1 * | 9/2001 | von Gutfeld et al. .... 156/275.5 |

OTHER PUBLICATIONS

U.S. patent application No. 0/425,711, YOR919990388, RJ Von Gutfeld et al., "A Method and System for Curable Sealant That Is Shadowed By Metallization", pp. 1–19, with Formal Drawings Figs. 1a–8.

U.S. patent application No. 09/757,164, YOR920000567US1, R.J. von Gutfeld et al., "System and Method for Producing Thin Film Patterns Interspersed with Voids to Admit Light to Otherwise Shadowed Regions", pp. 1–17, with Formal Drawings Figs. 1–9.

U.S. patent application No. 10/042,917 filed Jan. 7, 2002, YOR920010469US1, Abraham et al., "Method and System for Maintaining a Desired Distance Between a Dispensor and a Surface", pp. 1–25, with Formal Drawings Figs. 1A–4B.

U.S. patent application No. 09/635,661, filed on Aug. 10, 2000.

U.S. patent application No. 09/197,004, filed on Nov. 20, 1998.

* cited by examiner

Primary Examiner—Jeff H. Aftergut
Assistant Examiner—John T. Haran
(74) Attorney, Agent, or Firm—Thu Ann Dang, Esq.; McGinn & Gibb, PLLC

(57) ABSTRACT

A system (and method) includes a first substrate having both a transparent region and alternating opaque and transparent regions with respect to incident electromagnetic radiation, a radiation diffuser at least partially transparent to the incident electromagnetic radiation, a coupler for attaching the radiation diffuser to the first substrate to form a diffuser-substrate interface, a polymer used for affixing the first substrate to a second substrate, the polymer positioned between the first substrate and the second substrate along at least a peripheral region common to both the first and the second substrates, and a source of electromagnetic radiation incident onto the diffuser attached to the substrate for polymerizing the polymer.

32 Claims, 5 Drawing Sheets

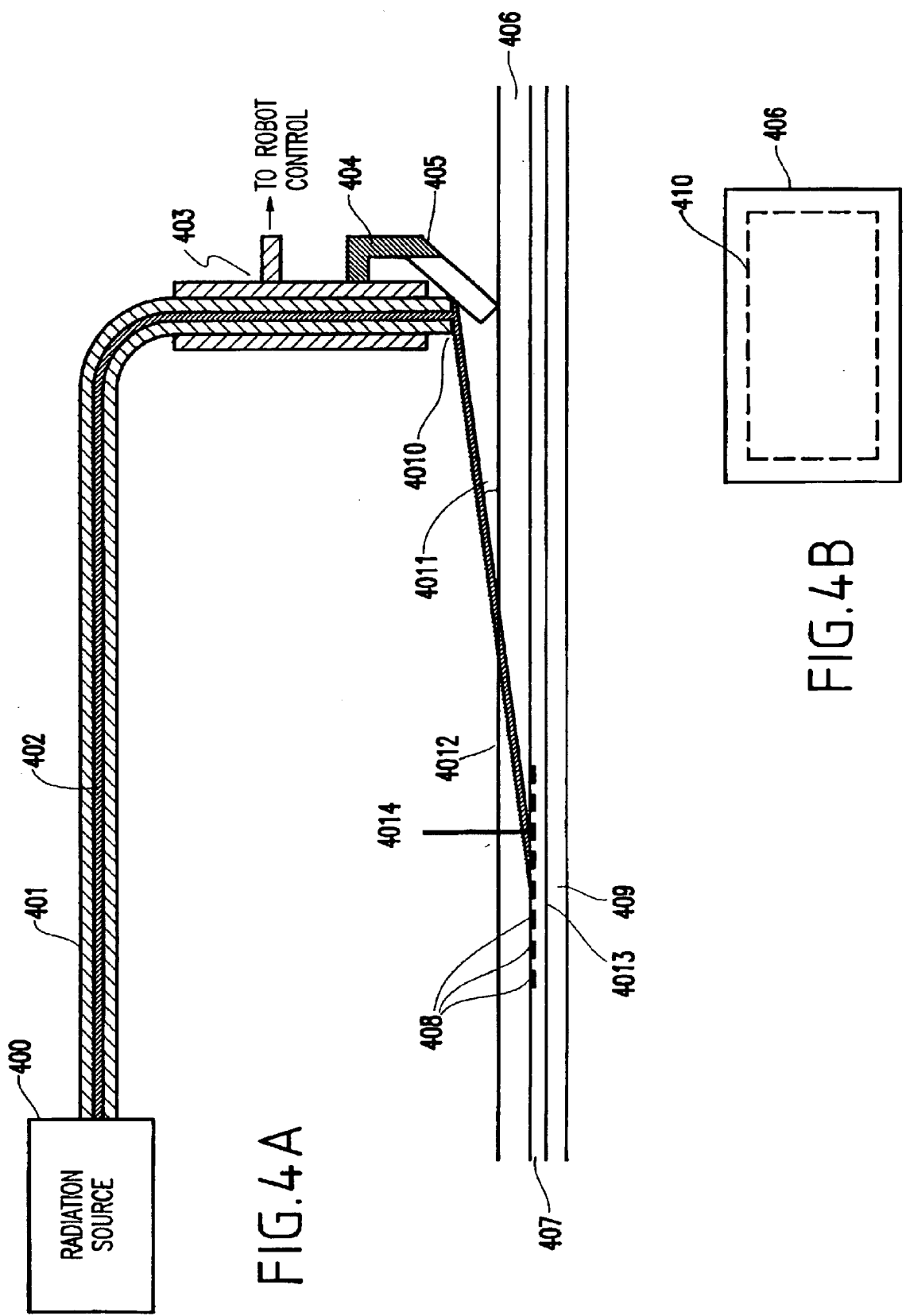

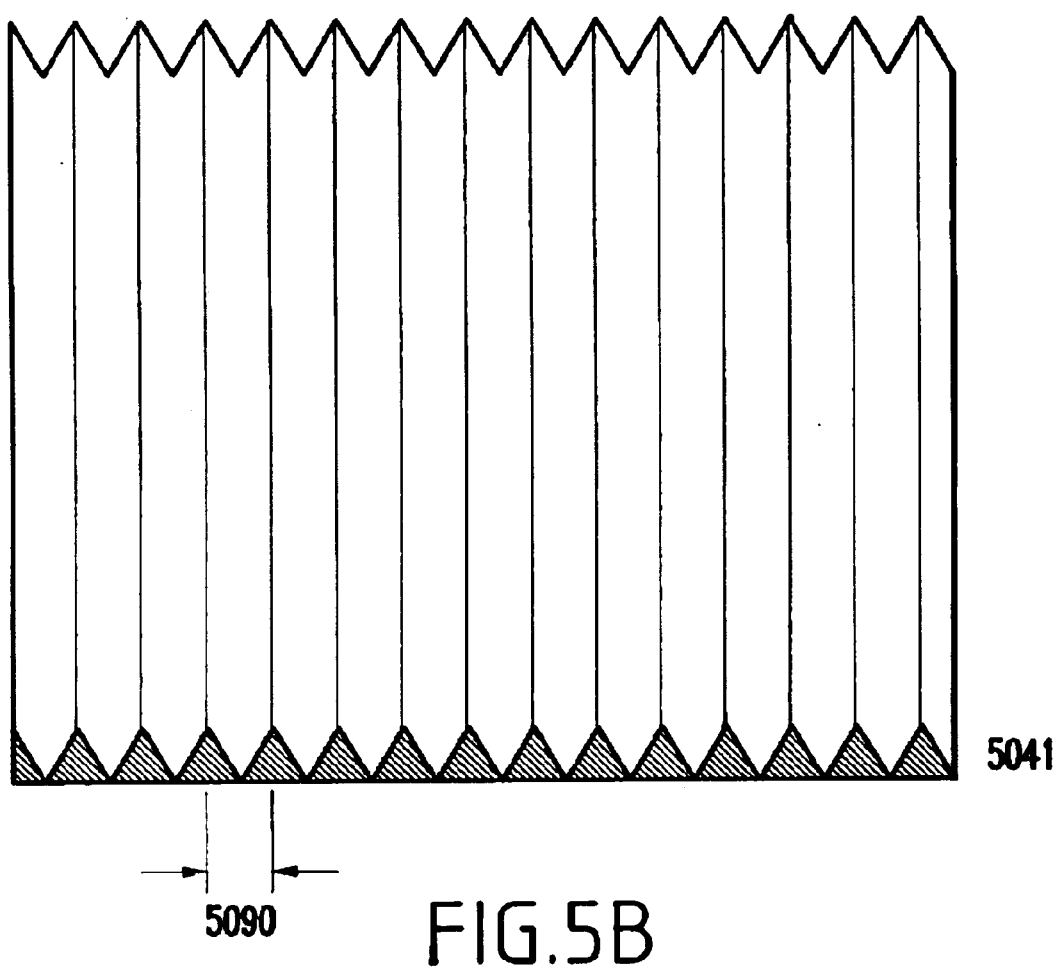

SYSTEM AND METHOD FOR UTILIZING DIFFUSE AND SPECULAR RADIATION TO OVERCOME SHADOWED REGIONS

CROSS-REFERENCE TO RELATED APPLICATIONS

The present application is related to U.S. patent application Ser. No. 09/197,004, filed on Nov. 20, 1998, to Robert Jacob von Gutfeld, entitled "PANEL ASSEMBLY FOR LIQUID CRYSTAL DISPLAYS", having IBM Docket No. YO998-441, to U.S. patent application Ser. No. 09/635,661, filed on Aug. 10, 2000, to James Glownia et al, entitled "METHOD AND STRUCTURE FOR MINIMIZING SHADOWING USING PHOTONS FOR SEALING TWO SUBSTRATES", having IBM Docket No. YOR9-2000-0120US1, to U.S. patent application Ser. No. 09/425,701, filed on Oct. 22, 1999, to Robert Jacob von Gutfeld et al., entitled "METHOD AND SYSTEM FOR CURING ULTRA VIOLET CURABLE SEALANT THAT IS SHADOWED BY METALLIZATION", having IBM Docket No. YOR919990264, to U.S. patent application Ser. No. 09/425,711 having IBM Docket No. YO999-388 and filed on Oct. 22, 1999, to Robert Jacob von Gutfeld et al., entitled "A METHOD AND SYSTEM FOR CURING A CURABLE SEALANT THAT IS SHADOWED BY METALLIZATION", to U.S. patent application Ser. No. 09/917,087, to Robert Jacob von Gutfeld et al., entitled "METHOD OF SEALING TWO SUBSTRATES WITH A NON-EPOXY OR EPOXY-ACRYLATE SEALANT USING LASER RADIATION", having IBM Disclosure No. YOR8-20010-438, to U.S. patent application Ser. No 10/042,917, to Robert Jacob von Gutfeld et al., entitled "A STRUCTURE AND METHOD FOR MAINTAINING A MOVING DISPENSING SYSTEM AT A CONSTANT HEIGHT ABOVE A GIVEN SURFACE", having IBM Docket No. YOR9-2001-0469US1, to U.S. patent application Ser. No. 09/757,164, filed on Jan. 9, 2001, to Robert Jacob von Gutfeld et al., entitled "SYSTEM AND METHOD FOR PRODUCING THIN FILM PATTERNS INTERSPERSED WITH VOIDS TO ADMIT LIGHT TO OTHERWISE SHADOWED REGIONS", and to U.S. Pat. No. 6,179,679, issued on Jan. 30, 2001, on an application filed on Oct. 22, 1999, entitled "METHOD AND SYSTEM FOR CURING ULTRAVIOLET CURABLE SEALANT THAT IS SHADOWED BY METALLIZATION, and having IBM Docket No. YOR9-1999-0264US1, each assigned to the present assignee, and incorporated herein by reference.

BACKGROUND OF THE INVENTION

1. Field of the Invention

The present invention relates to a method for forming liquid crystal display (LCD), and more particularly to a method for overcoming shadowing caused by a glue seal which is formed between first and second LCD panels during the formation of the LCD.

2. Description of the Related Art

Novel manufacturing methods are actively being explored to increase the throughput of LCD panels while decreasing the cost of liquid crystal display panels. Both cost and throughput are expected to be advantageously affected by using the so called "one drop fill" (ODF) method, a manufacturing process first described in U.S. Pat. No. 5,263,888, incorporated herein by reference.

Here, the liquid crystal is contained between two substrates that comprise the panel prior to sealing of the substrates. A peripheral fillet of uncured glue seal temporarily keeps the liquid crystal in place between the two substrates forming the liquid crystal display prior to polymerizing or curing of the sealant.

Since, in the ODF process, sealing of the edges of the two affixed substrates comprising the panel occurs with the liquid crystal already in place, the conventional oven thermal cure process for polymerizing the glue seal is generally not applicable for preferred panel sealants. Instead, the glue sealant is one that cures photolytically, customarily stimulated by incident ultraviolet radiation which in turn activates photoinitiators to chemically react to polymerize or cure the glue sealant. In this manner, overheating of the liquid crystal material in contact with the glue seal is prevented which would occur if conventional oven curing were used with the ODF process.

However, currently, a pressing problem is to overcome the shadowing that occurs when liquid crystal panels are sealed using light (typically ultraviolet (UV)) to produce photoinitiators that lead to curing or polymerization of the glue seal.

While a number of methods have been suggested to overcome this problem, no known method is inexpensive, easy to apply, or completely effective.

SUMMARY OF THE INVENTION

In view of the foregoing and other problems, drawbacks, and disadvantages of the conventional methods and structures, an object of the present invention is to provide a method and structure in which the problem of shadowing is overcome.

Another object is to provide a method and structure for directing radiation incident on an otherwise transparent substrate to regions underneath the areas of opacity.

In a first aspect of the present invention, a system (and method) includes a first substrate having both a transparent region and alternating opaque and transparent regions with respect to incident electromagnetic radiation, a radiation diffuser at least partially transparent to the incident electromagnetic radiation, a coupler for attaching the radiation diffuser to the first substrate to form a diffuser-substrate interface, a polymer used for affixing the first substrate to a second substrate, the polymer positioned between the first substrate and the second substrate along at least a peripheral region common to both the first and the second substrates, and a source of electromagnetic radiation incident onto the diffuser attached to the substrate for polymerizing the polymer.

With the unique and unobvious aspects of the present invention, a method is provided which is extremely inexpensive and simple to apply.

That is, the present invention provides a structural mechanism for directing radiation incident on an otherwise transparent substrate to regions underneath the areas of opacity. The opacity prevents radiation from being directed into and through the substrate by radiation incident in a direction normal to the substrate.

To solve the above-mentioned problems of the conventional methods, two inventive approaches are described.

A first approach uses diffusing elements that scatter radiation directed at normal incidence. The diffuse scattering elements are attached by a pressure-sensitive adhesive, and can be readily removed after irradiation.

A second approach uses a novel set of scanners configured in a manner that directs, preferably p-polarized radiation, at a relatively steep angle with respect to the surface normal (e.g., a relatively shallow angle with respect to the substrate surface) to the substrate to irradiate underneath the otherwise opaque region.

It is noted that, while several embodiments and applications are possible, the invention is described in terms of optical radiation required to reach areas underneath metallized or opaque regions on an otherwise transparent substrate. As described above, this problem arises especially, though not exclusively, in the manufacture of liquid crystal flat panel displays. Here, UV light is incident on the periphery of the panel to create photoinitiators to promote the curing of the polymeric glue seal that binds the two substrates comprising the flat panel display. However, metallization along certain regions of the substrate onto which the radiation is incident prevents the UV from reaching underneath the opaque metallization, thereby leaving unpolymerized sealant that can lead to contamination of the liquid crystal.

Hence, the present invention directs electromagnetic radiation for polymerizing or curing a sealant to affix two substrates to one another. For the preferred embodiment, ultraviolet radiation is directed at a first substrate having both transparent and alternating opaque and transparent regions with respect to the incident electromagnetic radiation.

To utilize radiation that is directed at or near normal incidence to the first substrate and yet have at least a component of radiation that penetrates beneath the opaque region of the first substrate, a radiation diffusing element, at least partially transparent to the electromagnetic incident radiation is attached to the first substrate in the regions of alternating opaque and transparent regions by a pressure sensitive adhesive with the pressure sensitive adhesive on one side of the diffusing element, the adhesive positioned intermediate to the diffuser-substrate interface.

Since the adhesive will be closely index-matched to the indices of refraction of both the diffuser and the substrate, the diffused radiation resulting from incident radiation directed at the substrate with the attached diffusing element will not undergo any substantial change of direction at the diffuser-adhesive or adhesive-substrate interfaces. Thus, the diffusely spread incident beam will remain diffusive as it passes into the substrate so that some radiation will penetrate underneath the opaque or shadowed region. Total internal reflection at the diffuser-substrate interface will be circumvented by the index matching at the diffuser-adhesive-substrate interfaces.

Preferably, a polymer sealant is used for affixing the first substrate to a second substrate along a peripheral region common to both substrates, the polymer reacting to an incident source of radiation to cause polymerization or curing of the polymer. After the polymerization step the diffusing element is removed from the substrate for possible re-use.

The diffusing element attached to the first substrate may include a tape with a matte finish to diffusely scatter incident light.

The diffusing element attached to the first substrate may include a grating tape.

Alternatively, a sheet (e.g., a polymer sheet) with an imprinted hologram can be affixed to the substrate to act as a diffusing element. The hologram can be designed to cause incident radiation, particularly normally incident collimated radiation to diffuse or spread into a large cone angle essentially acting as a negative lens, thereby directing at least a portion of the incident radiation underneath the opaque or shadowed region to cure the shadowed polymer between the first and second substrates. The polymer sheet with the imprinted hologram also may have a pressure-sensitive adhesive which allows the hologram to be attached to the first substrate and removed after the polymerization has been completed.

Alternatively, the invention includes methods that direct radiation at steep angles with respect to the normal of the first substrate onto a transparent or partly transparent substrate with or without the use of adhesive means for attaching an intermediate refracting element, the substrate including alternating opaque and transparent regions. As before, the substrate may be part of a panel comprising two substrates with a polymer glue seal positioned between the two substrates along one or more peripheral edges.

In one preferred embodiment, the bending of normally incident electromagnetic radiation is achieved through a thin transparent polymer sheet having periodic, closely spaced prismatic linear structures on the side of the transparent sheet facing and in contact with the first substrate. The prismatic structures are shaped to permit radiation directed at or near normal incidence from the smooth or non-prismatic side of the transparent sheet to be internally reflected from one face of the prism, then refracted or bent away from the incident normal to the prismatic structure's surface into air.

The resulting radiation enters the substrate at a near glancing angle with respect to the substrate's surface to penetrate beneath regions of opacity in order to polymerize the polymer glue seal along the periphery of the first and second substrates in both the alternating clear and opaque regions.

The preferred incident radiation for this embodiment is p-polarized as it is less reflected than s-polarized light at large incident angles with respect to the substrate incident normal. Thus, relatively more of the p-polarized light will enter the substrate for the intended purpose of polymerizing the glue seal. A commercially available material with this type of prismatic structure is manufactured by 3M™ and marketed under the tradename TRAF II™ where TRAF is an acronym for Transmissive Right Angle Film.

Another preferred embodiment that refracts radiation at large angles with respect to the incident normal or near glancing angles with respect to the substrate again makes use preferably of p-polarized radiation. Here, no intermediate refracting element is between the radiation source and the first substrate.

To obtain this embodiment, a flexible optical fiber is attached to a computer controlled robotic arm where one end of the fiber receives electromagnetic radiation from a source of radiation (e.g., a laser). The opposite end of the fiber from which the radiation exits is directed onto a mirror or reflecting surface also attached to the robotic arm. The reflector is tilted preferably at an angle such that the reflected radiation is directed at the substrate containing the opaque and clear regions at an angle of incidence with respect to the normal to the substrate in the range of about 40 degrees to about 90 degrees.

Again, for p-polarized radiation only a small fraction of the radiation on the order of 10–20% will be reflected at these incident angles from the substrate so that a substantial amount of radiation will enter the substrate and penetrate under shadowed or opaque regions. The robotic arm is scanned along the panel periphery so that the entire glue seal receives radiation to polymerize the glue seal affixing the two substrates to one another. In all instances, the present invention directs radiation into regions that are not transmissive to normal incidence radiation (e.g., where radiation is required in regions generally difficult to access by standard mechanism).

BRIEF DESCRIPTION OF THE DRAWINGS

The foregoing and other purposes, aspects and advantages will be better understood from the following detailed description of a preferred embodiment of the invention with reference to the drawings, in which.

FIG. 4 schematically illustrates a robotic-controlled fiber and scanning mirror according to the present invention for scanning a beam along the periphery of a substrate so that the beam enters at a relatively steep angle with respect to the incident normal to the substrate, thereby permitting the beam incident on the substrate to penetrate beneath shadowed or opaque regions of the substrate;

FIG. 5B illustrates a bottom surface of the prismatic material according to the present invention.

DETAILED DESCRIPTION OF PREFERRED EMBODIMENTS OF THE INVENTION

Figure 1:
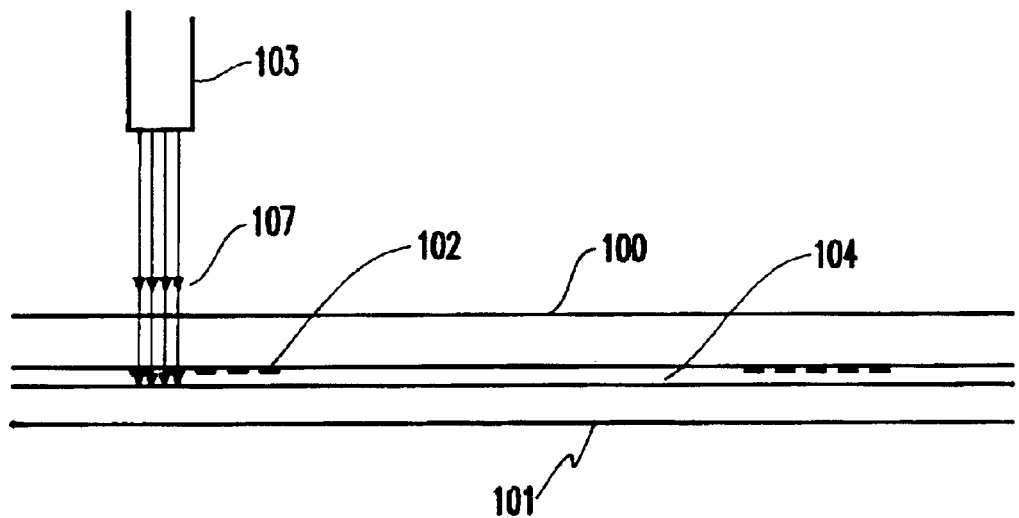
FIG. 1 shows a typical arrangement of two substrates 101, 102 that form a display panel together with the incident light used to cure the glue seal.

Referring now to the drawings, and more particularly to FIGS. 1–5B, there are shown preferred embodiments of the method and structures according to the present invention.

Prior to turning to the specifics of the Figures and the detailed description, it is noted that, in some aspects, the present invention may use a mechanism that is opalescent or causes light scattering due to an inclusion of scattering centers.

These centers may include a polymer or glass particles embedded within the tape whose refractive index causes bending of the light incident upon the tape. The shape of the scattering centers is such as to have regions of very small radii of curvature so that the incident light is bent in a variety of directions. The scattering centers are required to have an index of refraction somewhat different from the tape in which they are embedded.

An advantage of an adhesive-type of tape is that it requires no coupling agent between it and the glass to which it is attached. Thus, the tape can be readily applied to regions where shadowing is expected to occur. After final sealing of the panel, the tape can be readily removed.

Experiments with Scotch™ Highland Invisible tape, C-4210 shows some scattering occurs due to its opalescence. However the light scattering is small, on the order of only 6° by microscope measurements (showing proof of principle) but an angle which is clearly not large enough to solve panel shadowing problems. However, other tapes can be obtained or made to order so that large angle scattering occurs from highly curved scattering centers embedded within the tape.

The scattering centers can also be mirror finish particles so that light is reflected rather than refracted at many different angles. In that case, the particle shape could be spherical or tetrahedral to assure some reflections that would be reflected at angles aimed into the shadowed glue seal. At the same time, the particle density for reflectors should be limited so as not to block too much of the incident light needed for curing the glue seal.

Another structure comprises a material with matte finish (as previously proposed in the above-mentioned U.S. patent application Ser. No. 09/425,711 having IBM Docket No. YO999-388 and filed Oct. 22, 1999) in conjunction with double-back sticky tape to attach the scatterer to the substrate in the region of metallization or region of shadowing. The tape avoids using a liquid couplant as previously suggested.

The scatterer is simply removed from each panel after processing and reused if desired with the same or fresh double back sticky tape. By not having to use a liquid couplant, processing can be done in a vacuum, generally required for aligning and initial sealing of flat panel displays.

With the present invention, to direct radiation underneath an opaque region of an otherwise transmissive substrate, special materials are used that can be attached to the substrate that either scatter the incident radiation into a cone angle or redirect the radiation by means of interference patterns. A typical matte finish scatter may include various commercially available adhesives in the form of a tape such as 3M™ tape 6200. This tape can be easily attached to the opaque regions of the substrate and also easily removed after irradiation without damage to the substrate.

Interference patterns that result in light spreading into large cone angles can be obtained from HOLOGRAPHIC LIGHT SHAPING DIFFUSER (LSD®) supplied by the Physical Optics Corporation, of Torrance, Calif. These sheets can be pressure-sensitive, and spread a collimated light beam into cone angles as large as 95°, thereby directing light under at least part of an otherwise opaque region. The sheets are available with a pressure-sensitive adhesive so that they can be applied to the substrate receiving incident radiation the regions of opacity. After radiation, these sheets also can be readily removed without damage to the substrate.

It is noted that using adhesives to attach the diffuser elements provides a close matching of the indices of refraction of the diffuser and the glass Without the adhesive, an air gap could cause either internal reflection or a lessening of the cone angle provided by the diffuser. Both the tapes from 3M and the holographic diffuser are available in thicknesses on the order of 10's of microns making both easy to apply and to remove form the substrates.

First Embodiment

Turning now to the drawings, FIG. 1 shows a typical arrangement of two substrates 100, 101 that form a display panel together with the incident light used to cure a glue seal 104. As shown in FIG. 1, regions 102 of opacity prevent incident light from reaching the glue seal 104, thereby causing a shadowing effect.

More specifically, FIG. 1 shows a light source 103 (e.g., laser, ultraviolet, infrared, etc.) incident on substrate 101 including a semitransparent substrate with at least one region 102 of opacity. FIG. 1 shows a plurality of such regions 102 of opacity.

Light source 103 issues collimated rays of light 107 that are transparent in those regions of substrate 100 not containing the opaque regions 102. Glue seal 104 is present between the upper substrate 100 and the lower substrate 101 which affixes substrates 101 to 102 to one another upon polymerization of the glue seal 104. As mentioned above, the glue seal 104 is shadowed by the opaque regions 102 located on the underside of substrate 100. That is, the opaque regions cause shadowing in an area of the conducting leads for connection to the driver circuits for the LCD.

Thus, this configuration leaves glue regions 104, located directly beneath the opaque regions 102, uncured.

As mentioned above, the present invention provides a variety of mechanisms for overcoming the problems inherent in uncured glue, particularly when in contact with liquid crystal material. As mentioned above, the inability to cure the glue underneath these metal regions is commonly referred to as "shadowing."

Figure 2A:
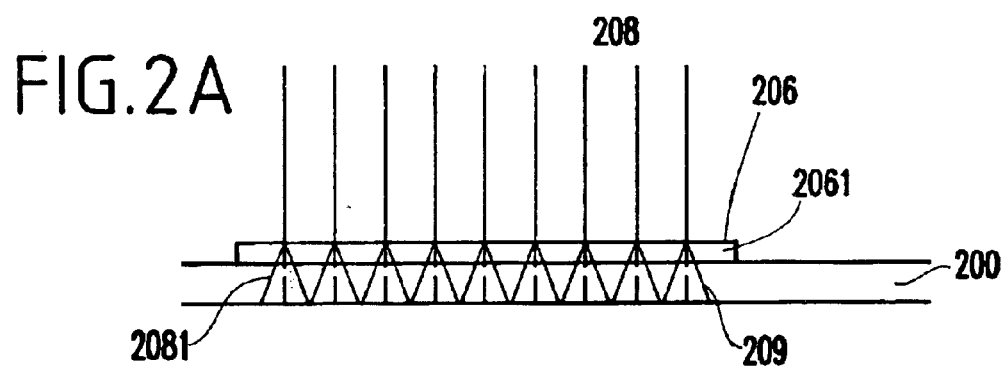
FIGS. 2A and 2B respectively show how the radiation spreads from the point of incidence of radiation, for a material having a matte finish and for a material that utilizes interference patterns.
Figure 2B:
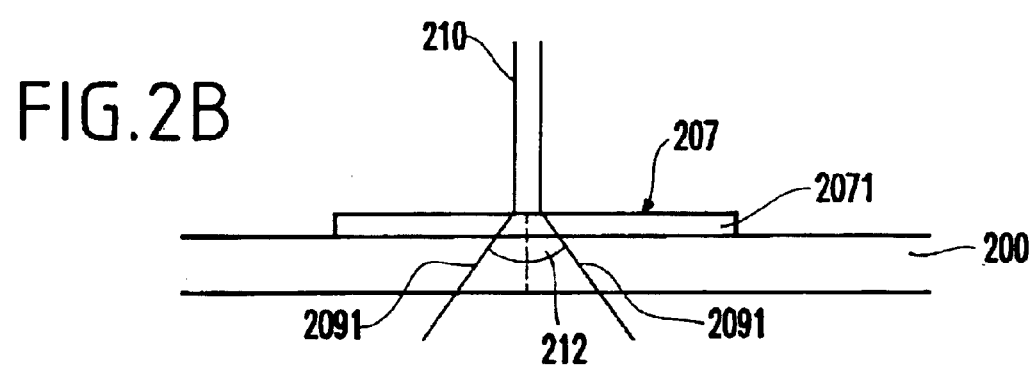

FIGS. 2A and 2B show how the radiation spreads from the point of incidence of radiation, and specifically, in FIG. 2A, for a material having a matte finish and, in FIG. 2B, for a material that utilizes interference patterns such as a holographic sheet.

More specifically, FIG. 2A shows schematically how light, even when collimated, can be spread by using a layer attached to the substrate. In one exemplary embodiment, the layer has a matte finish 206 which disperses light.

Here, radiation 208 is incident in collimated form on 206 which is attached by a pressure-sensitive adhesive 2061 to substrate 200. The radiation pattern, after entering the substrate 200, is shown by rays 2081, which are no longer columnar but are spread at an angle relative to the direction of the entering radiation (rays) 208.

Similarly, FIG. 2B shows the spread of a collimated beam 210 incident on a thin sheet 207 containing a holographic pattern that acts as a negative lens. Preferably, sheet 207 is attached to substrate 200 by a simple adhesive 2071 (e.g., a pressure-sensitive adhesive or the like), thereby allowing sheet 207 to be removed after radiation by the beam 210 is completed. The rays 2091 subtend an angle 212 indicating how the original collimated beam can be made to spread inside of substrate 200.

Figure 3A:
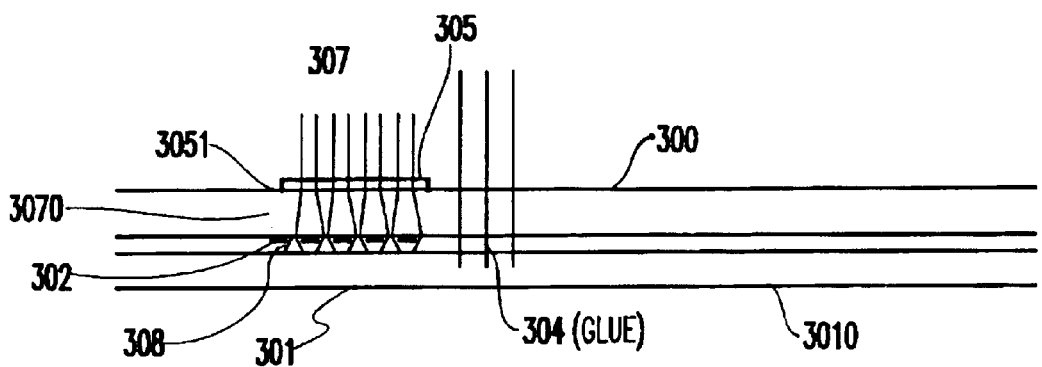
FIGS. 3A and 3B illustrate an electromagnetic energy scattering (or diffusing) element according to the present invention which is attached to the substrate having alternating opaque and transmitting regions with respect to the incident radiation such that the scattered radiation reaches the opaque regions to cure the glue seal underneath the opacity, with FIG. 3A illustrating a matte finish diffuser and FIG. 3B illustrating a holographic diffusing element.
Figure 3B:
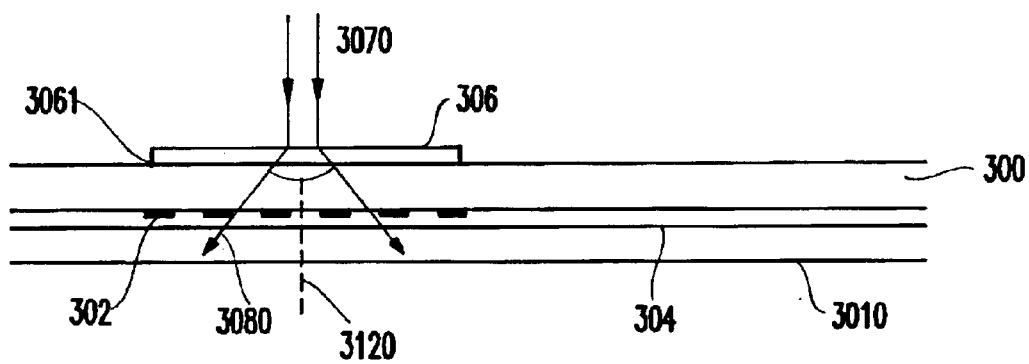

FIGS. 3A and 3B illustrate how the configurations shown in FIGS. 2A and 2B can be used to direct radiation underneath the otherwise shadowed region.

That is, FIGS. 3A and 3B illustrate an electromagnetic energy scattering or diffusing element which is attached to the substrate, having alternating opaque and transmitting regions with respect to the incident radiation, in order that the scattered radiation reaches the opaque regions to cure the glue seal underneath the opacity, with FIG. 3A illustrating a matte finish diffuser and FIG. 3B illustrating a holographic diffusing element.

Specifically, in FIG. 3A, the matte finish material 305 which is diffusely absorbing and reflecting is attached to substrate 300. Substrate 300 is the upper (first) substrate of a pair of substrates that is used to make the flat panel display. Radiation 307 directed at near normal incidence to the front surface of 305 is scattered within matte finish material 305 and therefore exits matte finish material 305 into substrate 300 diffusely.

The radiation is scattered such that some portion of the radiation 308 penetrates beneath the opaque regions 302. Because the radiation is diffusely scattered, some radiation 3070 reaches the regions underneath opacity regions 302, thereby to cure glue seal 304 underneath opaque regions 302.

In this manner, substrates 300 and 301 are affixed to one another by the curing of glue seal 304, even in regions otherwise shadowed by opacities 302, thereby overcoming the problem of shadowing.

Similarly, in FIG. 3B, the initially collimated radiation 3070 is incident at near an angle that is approximately perpendicular to the surface 306 which is attached to substrate 300 by an adhesive (e.g., preferably a pressure-sensitive adhesive). The holographic pattern imprinted onto 306 spreads the light into a large cone angle 3120 so that some light penetrates underneath the opacities or opaque regions 302.

Hence, the glue seal 304 receives the necessary light for curing so that substrate 300 and substrate 3010 (the lower substrate) are affixed to one another even in the region 304 lying underneath opacities 302.

Thus, with the first embodiment of the invention, the problems of shadowing are affirmatively overcome.

Second Embodiment

Additional preferred embodiments are described for directing radiation underneath regions of opacity without the use of an intermediate layer between the substrate and the source of radiation.

That is, in a second embodiment, FIGS. 4A and 4B illustrate a robotic-controlled fiber and scanning mirror for scanning a beam along the periphery of a substrate so that the beam enters at a steep angle (e.g,. within a range of about 40 to about 90 degrees) with respect to the incident normal to the substrate. This geometry permits the beam incident on the substrate to penetrate beneath shadowed or opaque regions of the substrate.

More specifically, FIG. 4A utilizes a radiation source 400 (e.g., preferably a laser but other light sources can be used including an ultraviolet light source, etc.) whose radiation is directed into a flexible optical fiber 401 The fiber is held in a mount 403, which in turn is attached to a robotic control unit (not shown). A reflecting surface 405 (e.g., a mirror or the like) directs the radiation from the output end of fiber 4010 onto the surface of the substrate 406 at a shallow angle 4011 (e.g., in a range of about 40 to about 5 degrees) with respect to the surface of substrate 406.

The radiation is bent by Snell's law towards the normal 4014 to the surface of substrate 406, still leaving radiation at a sufficiently shallow angle (e.g., between about 40 to about 5 degrees) with respect to the surface 406 to penetrate underneath opaque regions 408 to cure the glue seal 407 under regions 408. Again, substrates 406 and 409 are affixed to one another through the curing of glue seal 407 even in regions 408 that are otherwise opaque to normal incident radiation. Robotic arm 403 traces a path 410 along the periphery of the panel 406, as shown in a top view in FIG. 4B.

Third Embodiment

Figure 5A:
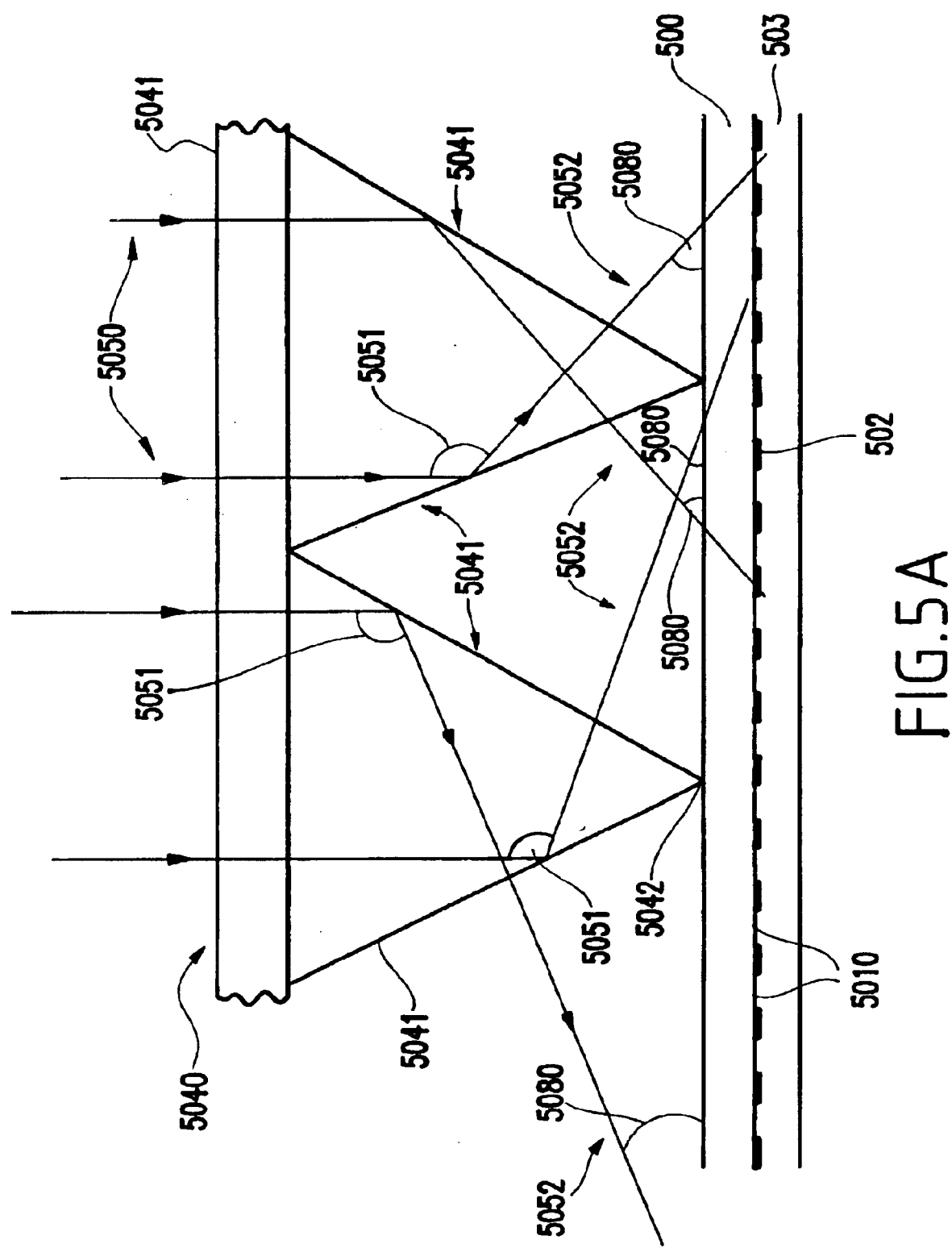
FIG. 5A illustrates a film with a prismatic structure on one side of the film according to the present invention, such that a side containing the prismatic ridges contacts the substrate, thereby allowing normal incident light to enter the substrate at a shallow angle to penetrate beneath the shadowed or opaque regions on the substrate.

FIG. 5A illustrates a film with a prismatic structure on one side of the film according to the present invention, such that a side containing the prismatic ridges contacts the substrate, thereby allowing normal incident light to enter the substrate at a shallow angle to penetrate beneath the shadowed or opaque regions on the substrate.

Specifically, FIG. 5A shows radiation 5050 incident on a smooth upper surface 5041 of a sheet of material 5040. This material is presently manufactured by the 3-M™ Corporation known as TRAF II™. Sheet 5040 is transmissive to the radiation 5050.

The bottom surface of sheet 5040 preferably has a prismatic shape 5041. The prisms 5041 run along the entire length of sample 5040, as shown in FIG. 5B, and are closely spaced from one another by a pitch 5090 that is on the order of about 10–100 microns. The prisms are shaped preferably such that light 5050 is totally internally reflected when incident on either one of the interior surfaces of prism 5041 as shown by angle 5051. The radiation 5052 emerges from prism 5041 from the opposite prismatic surface of 5041 at an angle near normal to the prism surfaces 5041 but at a relatively shallow angle 5080 (e.g., preferably within a range of about 45 to about 10 degrees generally depending upon the apex angle of the prism and the material of the prism) with respect to the surface of substrate 500. The relatively shallow angle 5080 allows radiation 5052 to penetrate below the metal or opaque regions 5010, thereby reaching glue seal 502 that affixes the upper substrate 500 to the lower substrate 503. For flat panel displays, the tips of prisms 5041 may be affixed to substrate 500 with a pressure-sensitive glue seal 5042. FIG. 5B illustrates a bottom surface of the prismatic material according to the present invention.

Thus, with the unique and unobvious features described above, the present invention can direct radiation such as UV light to otherwise shadowed or regions blocked by areas on substrates that are not transmissive to radiation. The present invention preferably uses either an adhesive tape that is opalescent or has a matte finish which causes light scattering. Then, the light exiting the tape enters the substrate at various angles allowing for some radiation to reach beneath the shadowed areas while the adhesive on the tape obviates the need for a coupling or index matching agent.

Alternatively, the invention can use holographic and prismatic tapes that can be applied during radiation used for glue processing. Further, the invention provides a scheme utilizing a light pipe that moves robotically along the periphery requiring radiation, such that the output of the radiation is directed with a reflector so that the radiation makes a shallow incident angle with respect to the substrate surface, preferably utilizing p-polarized radiation. The shallow angle allows light to penetrate beneath the shadowed region.

While the invention has been described in terms of several preferred embodiments, those skilled in the art will recognize that the invention can be practiced with modification within the spirit and scope of the appended claims.

For example, while a glue seal has been exemplarily described above, it is noted that in some applications there is no need to use an adhesive sealant (e.g., glue), especially in some cases when the prismatic structures are employed.

What is claimed is:

1. A system, comprising:
   a first substrate having both transparent and alternating opaque and transparent regions with respect to incident electromagnetic radiation;
   a radiation diffuser at least partially transparent to said incident electromagnetic radiation; said radiation diffuser comprising a removable tape having an adhesive for attaching said removable tape to said first substrate to form a diffuser-substrate interface;
   a polymer used for affixing said first substrate to a second substrate, said polymer positioned between said first substrate and said second substrate along at least a peripheral region common to both said first and said second substrates; and
   a source of electromagnetic radiation incident onto said diffuser attached to said first substrate for polymerizing said polymer.

2. A system as in claim 1, wherein said adhesive comprises a pressure-sensitive adhesive intermediate to said diffuser-substrate interface.

3. A system as in claim 2, wherein a side of said radiation diffuser with said pressure-sensitive adhesive is attached to said first substrate over said alternating opaque and transparent regions.

4. A system as in claim 1, wherein said incident radiation is directed onto said diffuser attached to said first substrate to cause polymerization of said polymer.

5. A system as in claim 4, wherein said removable tape is removed from said first substrate after said radiation incident on said diffuser has polymerized said polymer between said first and second substrates.

6. A system as in claim 1, wherein said removable tape comprises a matte finish to cause diffusion of said incident radiation.

7. The system of claim 1, wherein said removable tape comprises a grating tape.

8. A system, comprising:
   a first substrate having a region including alternating transparent regions and opaque regions with respect to incident electromagnetic radiation;
   a radiation diffuser at least partially transparent to said incident electromagnetic radiation, said radiation diffuser comprising a removable tape having an adhesive for attaching said removable tape to said first substrate containing said alternating opaque and transparent regions to form a diffuser-substrate interface; and
   a second substrate for being coupled to said first substrate.

9. The stem of claim 8, further comprising:
   a polymer used for affixing said first substrate to said second substrate, said polymer being positioned between said first and second substrate along at least a peripheral region common to both said first and said second substrates.

10. The system of claim 9, further comprising:
    a source of electromagnetic radiation incident onto said removable tape attached to said first substrate for polymerizing said polymer.

11. The system as in claim 8, wherein said adhesive comprises a pressure-sensitive adhesive on a side of said removable tape.

12. The system as in claim 11, wherein said side of said removable tape with said pressure-sensitive adhesive is attached to said first substrate.

13. A display, comprising:
    a first substrat a having alternating transparent regions and opaque regions with respect to incident electromagnetic radiation;
    a radiation diffuser at least partially transparent to said incident electromagnetic radiation, said radiation diffuser comprising a removable tape having an adhesive for attaching said removable tape to said first substrate containing said alternating opaque and transparent regions to form a diffuser-substrate interface; and
    a second substrate for being coupled to said first substrate.

14. The display as in claim 13, wherein said adhesive comprises a pressure-sensitive adhesive on a side of said removable tape.

15. The display as in claim 14, wherein said side of said removable tape with said pressure-sensitive adhesive is attached to said first substrate.

16. A method of sealing first and second substrates comprising:
    curing a glue sealing strip provided on a surface of at least one of the first and second substrates with electromagnetic radiation, said surface including transparent and opaque areas; and
    redirecting light to cure glue areas under the opaque areas, wherein said light is diffused by passing through a removable tape fastened to another surface of said at least one of the first and second substrates.

17. The method as in claim 16, wherein said removable tape comprises a pressure-sensitive adhesive on a side.

18. The method as in claim 17, wherein said side of said removable tape with said pressure-sensitive adhesive is attached to said first substrate.

19. A method, comprising:

providing a first substrate having both a transparent region and alternating transparent and opaque regions with respect to incident electromagnetic radiation;

attaching a radiation diffuser, at least partially transparent to said incident electromagnetic radiation, to said first substrate to form a diffuser-substrate interface;

affixing said first substrate to a second substrate with a polymer;

curing said polymer with electromagnetic radiation incident onto said diffuser attached to said substrate for polymerizing said polymer such that light is redirected to cure the polymer under the opaque areas, wherein said radiation diffuser comprises a removable tape.

20. The method of claim 19, wherein said removable tape comprises a pressure-sensitive adhesive intermediate to said diffuser-substrate interface.

21. The method of claim 20, wherein a side of said removable tape with said pressure-sensitive adhesive is attached to said first substrate over said alternating opaque and transparent regions.

22. The method of claim 19, wherein said incident radiation is directed onto said diffuser attached to said first substrate to cause polymerization of said polymer.

23. The method of claim 22, wherein said removable tape and said adhesive are removed from said first substrate after said radiation incident on said diffuser has polymerized said polymer between said first and second substrates.

24. The method of claim 19, wherein said removable tape comprises a matte finish to cause diffusion of said incident radiation.

25. The method of claim 19, wherein said removable tape comprises a grating tape.

26. A system, comprising:

a first substrate having both transparent and alternating opaque and transparent regions with respect to incident electromagnetic radiation; and a radiation diffuser at least partially transparent to said incident electromagnetic radiation, said radiation diffuser being attached to said first substrate to form a diffuser-substrate interface, wherein said radiation diffuser comprises a removable tape.

27. The system of claim 26, further comprising:

a polymer used for affixing said first substrate to a second substrate, said polymer positioned between said first substrate and said second substrate along at least a peripheral region common to both said first and said second substrates; and a source of electromagnetic radiation incident onto said diffuser attached to said first substrate for polymerizing said polymer.

28. The display as in claim 26, wherein said removable tape comprises a pressure-sensitive adhesive on a side.

29. The display as in claim 28, wherein said side of said removable tape with said pressure-sensitive adhesive is attached to said first substrate.

30. A method, comprising:

providing a first substrate having both a transparent region and alternating transparent and opaque regions with respect to incident electromagnetic radiation;

attaching a radiation diffuser, at least partially transparent to said incident electromagnetic radiation, to said first substrate to form a diffuser-substrate interface;

affixing said first substrate to a second substrate: and redirecting light to avoid shadowing under said opaque regions, wherein said radiation diffuser comprises a removable tape.

31. The method as in claim 30, wherein said removable tape comprises a pressure-sensitive adhesive on a side.

32. The method as in claim 31, wherein said side of said removable tape with said pressure-sensitive adhesive is attached to said first substrate.

* * * * *